Figure 1:
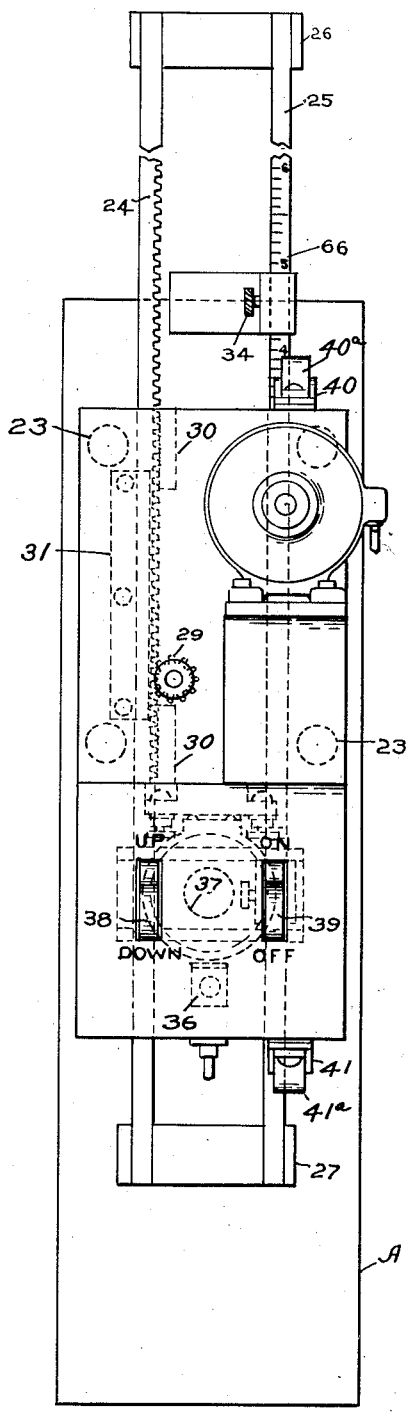

Nov. 15, 1938.  W. C. HUEBNER  2,136,588
MEANS FOR CONTROLLING PHOTOGRAPHIC EXPOSURES
Filed Nov. 28, 1936  5 Sheets-Sheet 1

INVENTOR
William C. Huebner
By Joseph Harris
ATTORNEY

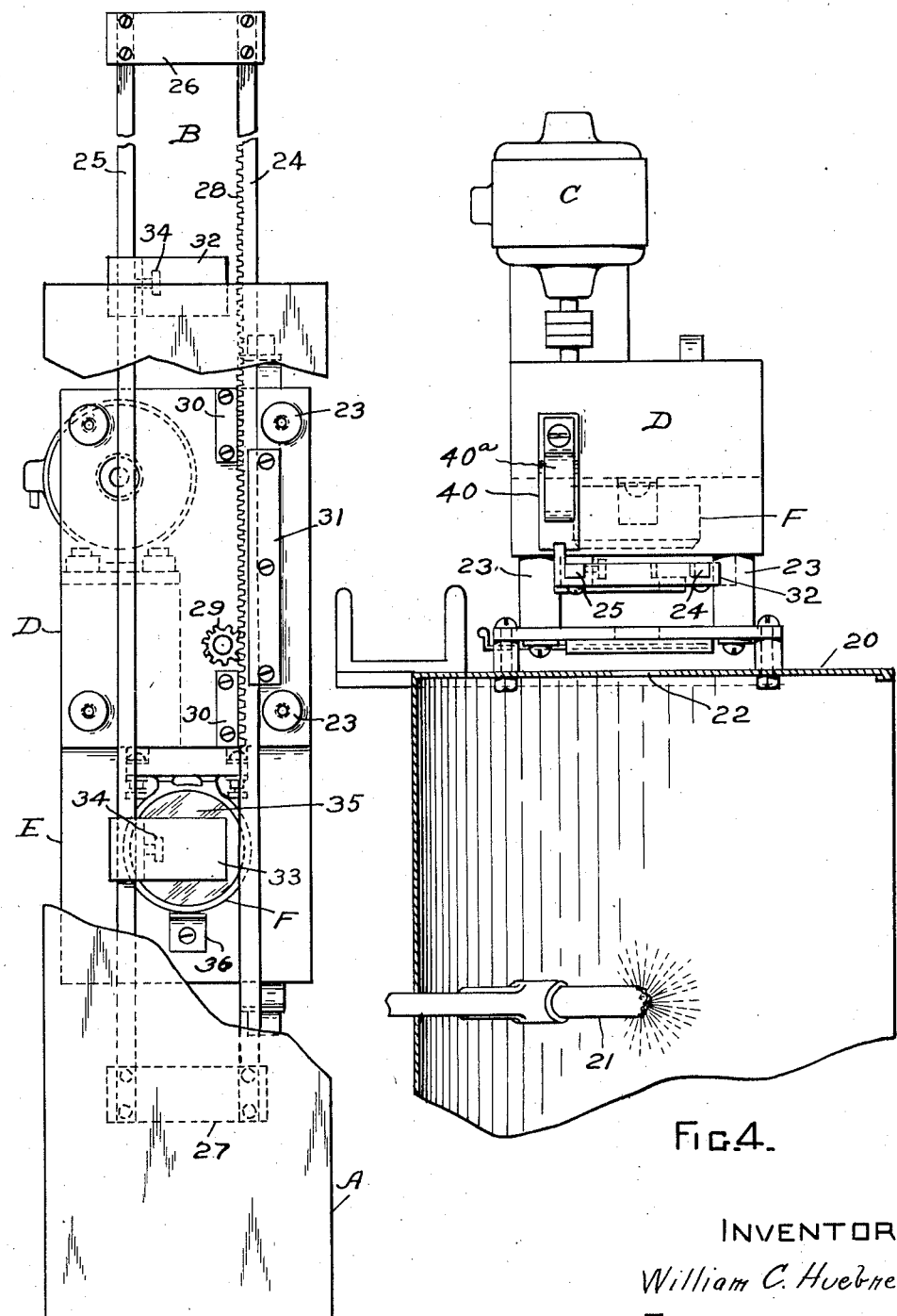

Nov. 15, 1938.    W. C. HUEBNER    2,136,588
MEANS FOR CONTROLLING PHOTOGRAPHIC EXPOSURES
Filed Nov. 28, 1936    5 Sheets-Sheet 3
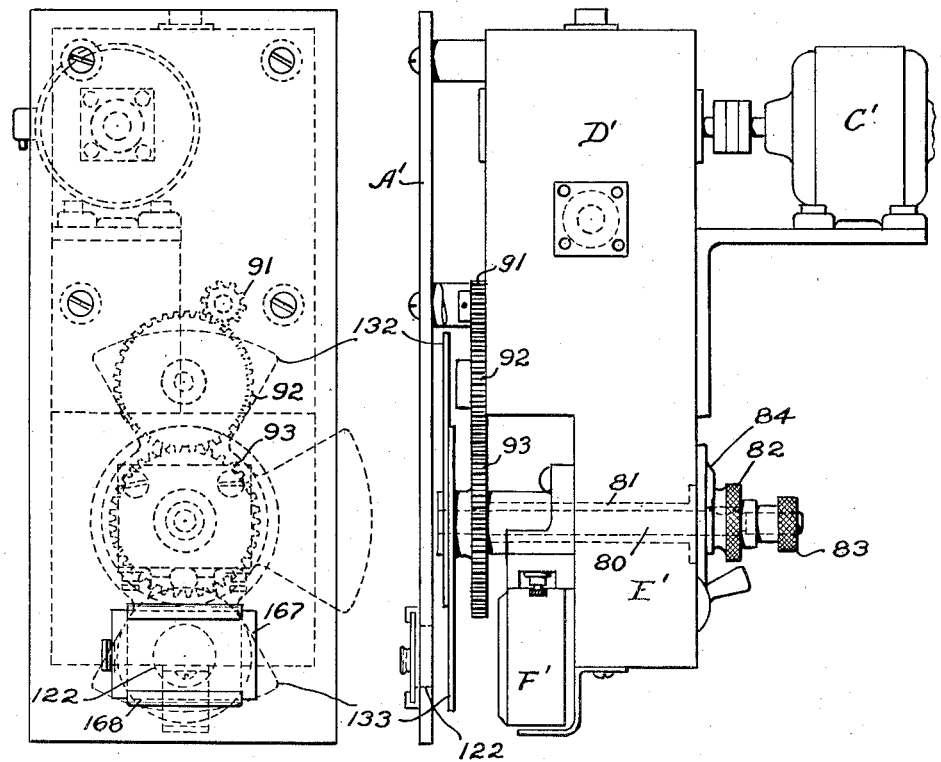
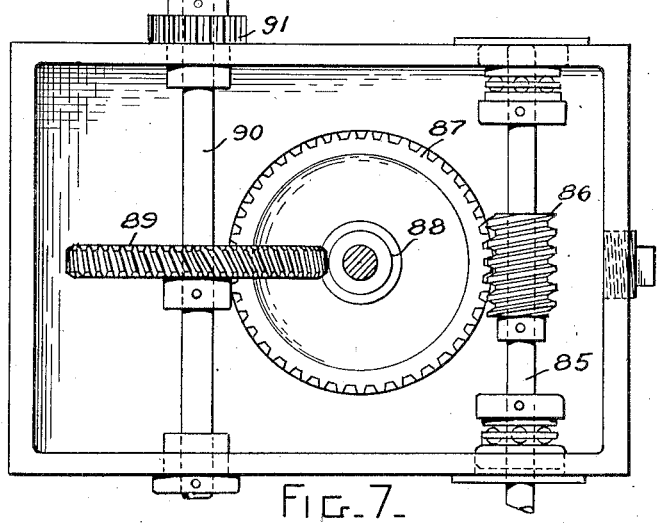
INVENTOR
William C. Huebner
BY Joseph Harris
ATTORNEY Nov. 15, 1938.  W. C. HUEBNER  2,136,588
MEANS FOR CONTROLLING PHOTOGRAPHIC EXPOSURES
Filed Nov. 28, 1936  5 Sheets-Sheet 4

INVENTOR
William C. Huebner
BY Joseph Harris
ATTORNEY.

Nov. 15, 1938.　　　　W. C. HUEBNER　　　　2,136,588
MEANS FOR CONTROLLING PHOTOGRAPHIC EXPOSURES
Filed Nov. 28, 1936　　　5 Sheets-Sheet 5
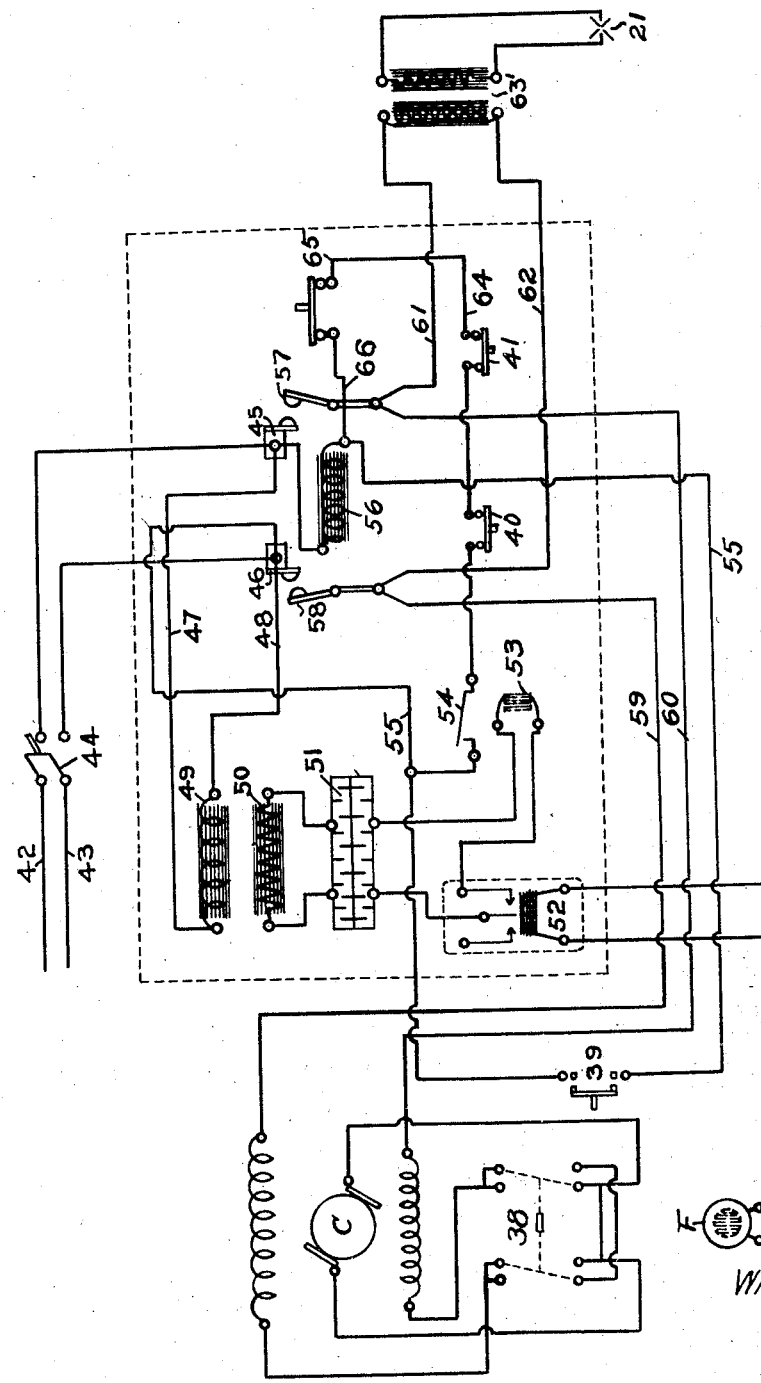

Patented Nov. 15, 1938

2,136,588

UNITED STATES PATENT OFFICE 2,136,588

MEANS FOR CONTROLLING PHOTOGRAPHIC EXPOSURES

William C. Huebner, New York, N. Y.

Application November 28, 1936, Serial No. 113,174

11 Claims. (Cl. 95—10)

This invention relates to improvements in means for controlling photographic exposures.

In the art of photographic reproductions, and more particularly photographic reproductions by photo-mechanical processes, the variations in the light action on the widely different characteristics of sensitive solutions used to make negatives, positives, press plates and press cylinders, require extremely accurate and precise control of the light exposures in order to obtain commercially satisfactory results. To meet such exacting requirements, it is not only highly desirable but practically a commercial necessity to employ repeating exposure controlling means capable of determining the quantum of light delivered to the light sensitive coating.

Exposure controllers for the purpose indicated have heretofore been employed, such, for instance, as disclosed in my prior Patent No. 1,496,638, granted June 3, 1924. The exposure controller of said patent and all other prior controllers, so far as I am aware, are subject to several practical disadvantages, among which are the following. In the first place, the period for any exposure for which the controller might be set, was left entirely to the judgment of the operator and without any means, except expensive trial and error methods, to inform the operator as to the exact requirements which vary radically not only for different sensitive solutions but even for the same solution under different conditions of age, temperature and humidity of the atmosphere. Secondly, all prior exposure controllers, so far as I am aware, have necessitated a large number of delicately machined and finely adjusted parts in the controller proper to effect, mechanically, the necessary starting, stopping and reversing of the usual driving motors and shutting off of the light current, all with resulting more or less shock and jar at each change of condition of the controller. Controllers of the character in question are subject to hard usage commercially and experience has shown that those of prior types, because of their mechanical manner of control and delicacy of parts and excessive wear from shock and jar action, soon become inefficient and unreliable.

One object of the present invention is to provide a photographic exposure controller of simple construction and few parts, practically free from wear and so operated as to be free from mechanical shocks or jarring when starting and stopping.

Another object of the invention is to provide a controller of the type indicated, wherein the starting of the controller is effected merely by closing an electric switch and the stopping is effected automatically at the end of the delivery of the exact amount of light, by electrical influences rather than mechanical means.

A further object of the invention is to provide means and method by which the exact quantum of light may be precisely determined for properly exposing any particular sensitive coating at the time of its exposure, such determined quantum of light taking into account all the variables of the coating, including its composition, age and temperature and humidity of the atmosphere, to thereby eliminate all guess work and trial and error methods heretofore deemed necessary.

A specific object of the invention is to provide a photographic exposure controller wherein the driving motor and the source of light for making the exposure are automatically shut off at the end of the proper exposure period by means of a photo-electric cell or the like, the condition of which is controlled by light rays emanating from the source of light used to make the exposure.

Another specific object of the invention is to provide a photographic exposure controller and method of utilizing a photo-electric cell and specimen of the sensitive coating having identical characteristics of the sensitized element to be exposed, to accurately predetermine the exact quantity of light necessary to effect a proper exposure and from which predetermination, the controller proper may be accurately adjusted for making the actual exposures.

Other objects of the invention will more clearly appear from the description and claims hereinafter following.

Figure 2:
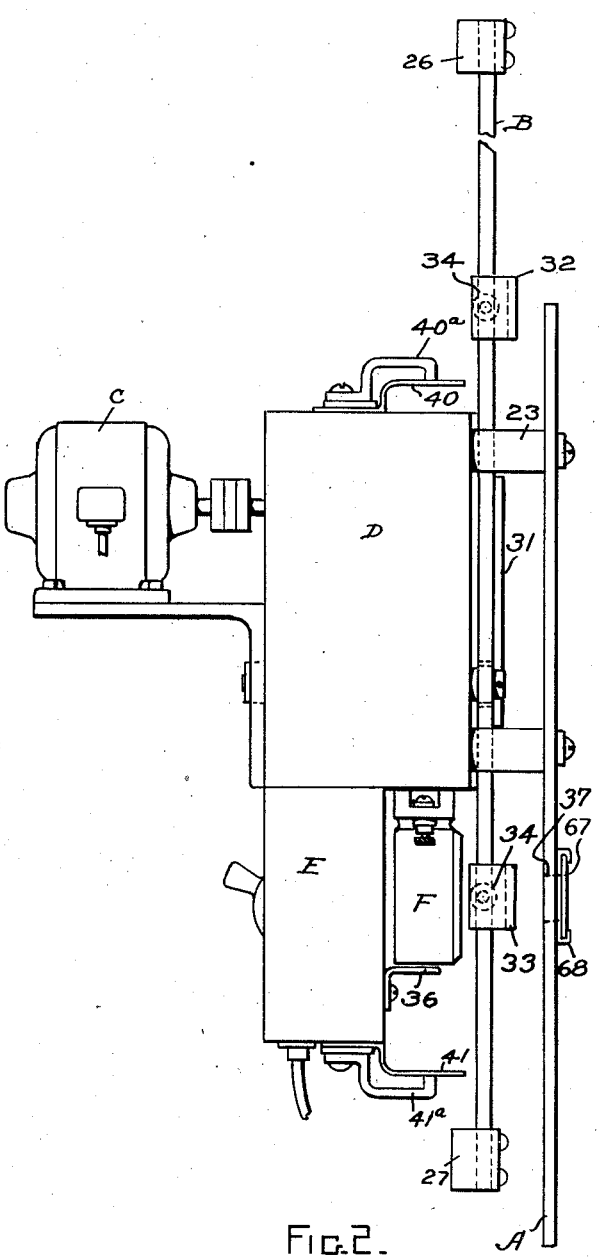
Figure 8:
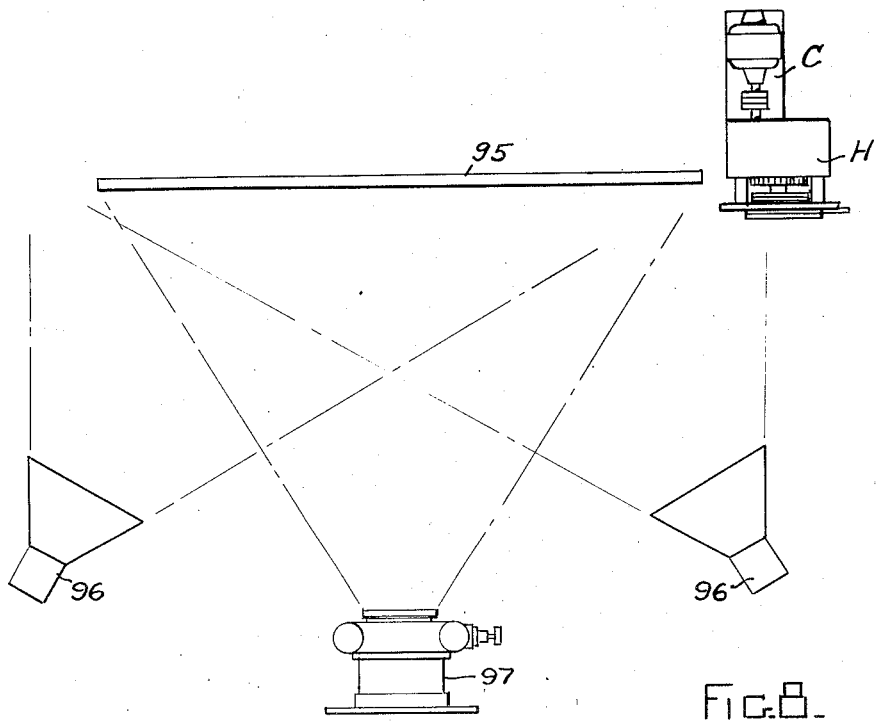
Figure 9:
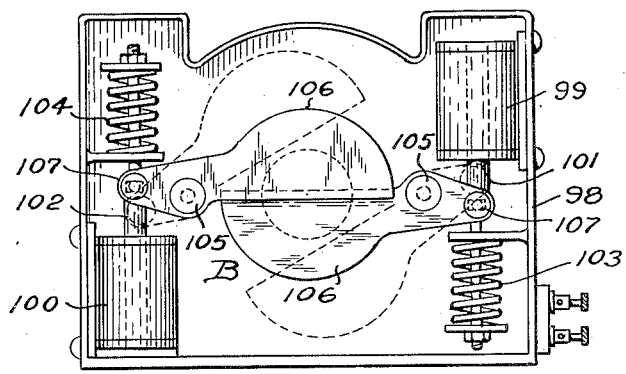

In the drawings forming a part of this specification, Figure 1 is a front elevational view of the exposure controller proper illustrating one embodiment of the invention. Figure 2 is a side elevation of the structure shown in Figure 1. Figure 3 is a rear elevation of the structure shown in Figure 1, parts of the supporting plate being broken away to better illustrate certain details of construction. Figure 4 is a top plan view of the exposure controller proper, shown in the preceding figures and illustrating its relation with respect to an arc lamp, the housing for the arc lamp being shown in horizontal section with parts broken away. Figure 5 is a rear elevation of an exposure controller embodying the invention illustrating a somewhat different shutter or light interceptor means. Figure 6 is a side elevation of the structure shown in Figure 5. Figure 7 is a top plan view of the reducing gearing employed in the structure shown in Figures 5 and 6, the top of the gear box being removed. Figure 8 is a diagrammatic view illustrating the manner of employing the exposure controller of the present invention in conjunction with a camera. Figure 9 is an elevational view, upon an enlarged scale, of the shutter mechanism employable with a camera lens of the structure shown in Figure 8. And Figure 10 is a diagram illustrating the wiring and electrical parts of the complete exposure controller apparatus.

Referring first to the construction illustrated in Figures 1 to 4 inclusive, the exposure controller proper comprises, broadly, a supporting plate A; a reciprocating shutter or light-intercepting member B; a driving motor C; a gear reduction housing D; a switch control box E; and a photo-electric cell F.

The supporting plate A is adapted to be secured to the hood 20 of the arc lamp, of which the arc is indicated at 21. As will be understood by those skilled in the art, the controller proper may be secured to any other suitable support, the essential requirement being, however, that the controller proper shall be supported in such position that rays of light from the source of light utilized in making the exposure, may fall upon the photo-electric cell F. As shown in Figure 4, this is accomplished by permitting certain of the light rays from the arc 21 to pass through the opening 22 of the hood which opening is horizontally in line with the cell F, as illustrated in Figure 2, for the purpose hereinafter described.

The switch box E is rigidly united with the gear reduction box D and the latter is directly supported from the plate A in spaced relation thereto by means of a plurality of spacers 23—23. Suitably mounted on the gear reduction box D between the latter and the supporting plate A, is the shutter member B. Said member B preferably comprises two laterally spaced vertically extending bars 24 and 25 rigidly connected at their tops and bottoms by tie plates 26 and 27. The bar 24 is provided on its inner edge with a vertically extending rack 28 with which cooperates a driving gear 29 in turn driven at reduced speed from the motor C through gear reducing mechanism, not shown, disposed within the box D. The member B is guided in its vertical up and down movements by any suitable means such as the guide plates 30—30 and overhanging guide plate 31, secured to the gear reduction box D, as clearly shown in Figure 3.

Vertically independently adjustable on the other bar 25 of the shutter member B, are two shutters or light interceptors 32 and 33, adjustment thereof being effected by the set screws 34—34. As clear from Figure 3, the vertical path of movement of the shutters 32 and 33 is such as to extend over the opening or eye 35 of the photo-electric cell F.

The photo-electric cell F, shown conventionally, is plugged into a suitable socket on the under side of the box D and, as a matter of safety to prevent accidental dropping out of the cell F, a safety ledge or clip 36 may be located therebeneath and which is secured to the switch box E. As clearly shown in Figure 2, the cell F is so located that the shutters 32 and 33 move in a path between the cell F and the hole 22 of the light hood and, further, to permit said light rays to reach the opening 35 of the cell F, the supporting plate A is provided with a suitable opening 37 in line with the cell F and hole 22.

On the switch box E, are located two electric control switches 38 and 39, the former being a directional or reversing control switch for the motor C, and the switch 39 being what may be termed a momentary starting switch which normally occupies an "off" position.

Also mounted on the controller proper, are upper and lower safety or limiting control switches 40—40ᵃ and 41—41ᵃ. The spring contact elements 40 and 41 of said two switches are adapted to be flexed downwardly and upwardly, respectively, so as to break contact with the fixed members 40ᵃ and 41ᵃ, respectively, of the switches, to limit the up and down movement of the member B should there be a failure at any other point in the electric system. The upper switch 40—40ᵃ is adapted to be opened by the top tie member 26 and the lower switch 41—41ᵃ is adapted to be opened by the lower tie plate 27 upon extreme movements of the member B.

As is well known to those skilled in the art, the quantum of light necessary to produce a given exposure on a sensitized surface, may be said to be the product of the intensity of the light multiplied by the period of time during which the light is acting on the sensitized surface. It is further common knowledge that the intensity of light delivered from any light source, operated from a line wire source of current, varies with the voltage or intensity of the current supply and the voltage, commercially, varies from time to time. For this reason, proper exposures cannot be left dependent solely on a strictly time element since, if the voltage drops, a longer time period is necessary to deliver the desired quantity of light, and, conversely, if the voltage is higher, a lesser period of time is necessary. Hence, in utilizing the present invention, the motor C is of the series wound type, the speed of which varies in accordance with the voltage delivered to the terminals thereof.

Referring now to Figure 10, one suitable wiring diagram is there illustrated as would be employed in connection with a main source of A. C. current delivered through the main wires 42—43, the main line having a switch 44 included therein as customary. Said main line wires 42 and 43 are connected to terminals 45 and 46 from which run the wires 47 and 48 to the primary 49 of a transformer. To the terminals of the secondary 50 of the transformer is connected a preferably 6 volt D. C. rectifier 51. In circuit with the D. C. side of said rectifier is a light-sensitive relay indicated conventionally at 52 and a preferably 6 volt relay 53 which controls a contact 54. The photo-electric cell F is in circuit with the light-sensitive relay 52.

From the terminal 46 runs a line 55 in which is included the momentary switch 39 heretofore referred to, said line 55 leading back to the terminal 45 and having included therein a solenoid 56 which controls the clapper switches 57 and 58, the latter, when closed, obviously completing circuit with the main line wires 42 and 43 through the terminals 45 and 46.

From the clapper switch 58 the wire 59 extends to the motor reversing switch 38 heretofore referred to and the return line from the motor is indicated at 60, the latter connecting up with the clapper switch 57 as shown. The arc lamp 21 is also controlled from the clapper switches 57 and 58 through the wires 61 and 62 which have included in circuit therewith the arc transformer or resistor 63.

The operation of the exposure controller is as follows, assuming that the position of the parts is as shown in Figure 2, that is, with the lower shutter or light interceptor 35 in position in front of the cell F so as to shut off or intercept the light from the arc 21. The motor directional control switch 38 is moved to its "down" position. The operator then moves the momentary switch 39 (which is normally in "off" position) to the "on" position, thus temporarily closing said momentary switch and completing the circuit through the solenoid 56 which in turn closes the clapper switches 57 and 58. Closure of the clapper switches 57 and 58 in turn closes the circuits both to the motor C and the arc lamp 21. With the motor C now operating, the shutter member B will be moved downwardly and the operator continues to hold the momentary switch 39 in the "on" position until the lower shutter 33 has dropped below the line of the light rays coming from the arc lamp which, ordinarily, will only be a few seconds. The momentary switch 39 is then released and allowed to go back to its "off" position. As soon as the shutter 33 has passed below the line of the light rays to the cell F, the light acts on the cell F, thus operating the light-sensitive relay 52 and closing the circuit to the relay 53 which in turn closes the contact 54. The contact 54 is included in a line 64 which is tapped off from the motor line 55 and leads to an auxiliary contact switch 65 and from the latter through wire 66 which is tapped into the line 55 adjacent the solenoid 56. Said auxiliary contact switch 65, in a normal circuit employing 110 volts A. C., will always normally be closed. As will be seen therefore, as soon as the photo-electric cell F becomes actuated by the light and continues so actuated, current will be supplied to both the motor and the arc lamp. This condition of the electrical system continues until the upper shutter or light-interceptor 32 becomes positioned in front of the cell F, whereupon, the cell F becoming inactive, the relay 52 opens, thus in turn causing opening of the relay switch 54 and opening both circuits to the motor and arc lamp, thereby stopping further movement of the member B and shutting off the arc lamp and completing the exposure period. For a succeeding repeat exposure, the operator moves the directional control switch 38 for the motor to the "up" position; then holds the momentary switch 39 in its "on" position for a few seconds and until the upper shutter 32 is moved out of the path of the light rays to the cell F. The momentary switch is then released and the shutter member B will continue to move upwardly until the lower shutter 33 comes in front of the cell F when the motor and arc lamp are again shut off. In this manner, it is evident that repeat exposures may be made with absolute assurance of equal quantums of light being delivered to the sensitized surface being exposed. It will further be evident that the starting and stopping of the controller is free from mechanical shocks or jars and there are no delicate parts subject to excessive wear.

In the event of accidental failure of any of the relays or other automatically operated contacts of the electric system to properly function to shut off the motor and arc lamp, continued movement of the shutter member B will open either of the switches 40—40a or 41—41a, dependent upon the direction in which the shutter member B is moving, thus positively insuring opening of the motor and arc lamp circuits since said safety switches are included in the line 64, as shown in Figure 10.

As will be evident from the preceding, the total quantity of light transmitted from the source of light to the sensitized surface being exposed, will be dependent upon the spacing between the two shutters 32 and 33 and this spacing may obviously be varied by the operator for different conditions. To facilitate the desired spacing, the bar 25 of the shutter member B may be provided with a suitable scale as indicated at 66 in Figure 1. Once the spacing between the shutters 32 and 33 has been determined, it is evident that all repeat exposures will produce uniformly exposed images on the same sensitized surface and all that is required of the operator is the manipulation of the two switches 38 and 39. Even though the voltage of the supply current fluctuates during repeat exposures, the quantum of light will nevertheless remain the same since the motor C will vary in its speed in direct ratio with the voltage.

As hereinbefore indicated, different exposure periods are necessitated by different sensitized coatings and also by variations in the coatings due to age, temperature and atmospheric conditions. In order to eliminate trial and error methods to determine the proper exposure period for any particular sensitized element being exposed, the following method and means are employed in connection with the controller so far described. In preparing a plate to be subsequently exposed, a strip of film, such as acetate, for instance, is mounted on the edge of such plate as by means of adhesive tape so that the film strip projects from the edge of the plate, but in line with the surface thereof to be sensitized. When the sensitive coating solution is applied to the plate, it also coats the strip of film and obviously with a coating having identical characteristics. When the plate is dry, and of course the strip of film attached thereto and ready for exposure, the film strip is removed and a piece thereof, such as indicated at 67, is inserted in a guide 68 adjacent the hole 37 of the supporting plate A, as shown in Figures 2 and 4. The starting shutter, such as the bottom shutter 33, is set over the opening of the cell F, as shown in Figure 2, and the other or top shutter 32 is moved up to its topmost limit. The starting switches 38 and 39 are then operated as hereinbefore described, thus causing light to pass through the coated section of film 37. The starting or momentary switch 39 is released as previously described, as soon as the shutter 33 has passed out of the path of the light rays and the motor and arc lamp will continue to operate so long as the light is able to pass through the film section 67. The light action on the sensitive coating of the film section gradually turns the color of the bichromate in the solution on the film to a dark brown, as well understood, thus checking or intercepting the passage of light to the cell F. The current generated by the cell is thereby weakened to a point where its relay 52 no longer functions, thus opening the clapper switch and thus the circuits to the motor and the arc light. The shutter member B is thereby stopped and the operator then adjusts the upper shutter 32 so that it is directly in front of the cell F and secures said shutter in such adjusted position by the set screw 34. In this manner, it is obvious that the exact exposure period is determined for the particular sensitive coating on the plate to be exposed and all variable factors are automatically compensated for, such as the age of the coating solution, the temperature and conditions of humidity. Upon removing of the film section 67, the plate can then be exposed with perfect assurance that the proper exposure period has been ascertained and will be repeated for such number of exposures as may be required on the plate without any further adjustment of the shutters and thereby eliminating trial and error methods heretofore deemed necessary.

Referring now to the embodiment of the invention shown in Figures 5, 6 and 7, the construction includes a motor C', gear reduction box D', supporting plate A', switch box E' and photoelectric cell F', all substantially the same as in the first described form.

Instead, however, of using a vertically reciprocating shutter member B, a rotary shutter or light intercepting device is employed, the same comprising two shutter members or light interceptors proper 132 and 133 mounted on an inner shaft 80 and outer sleeve shaft 81, respectively. Said two shafts 80 and 81 are relatively angularly adjustable as by means of the setting knurled nut 82 and the lock nut 83. A fixed dial 84 may also be employed to facilitate the setting of the shutter blades 132 and 133. As will be apparent, by varying the angular relation between the shutter blades 132 and 133, as shown by the dotted lines in Figure 5, the interval or period between which said shutter blades pass in front of the photo-electric cell F', can be regulated as desired, it being apparent from Figure 6 that said shutter blades rotate in a plane intermediate the supporting plate A' and the cell F'.

Suitable reduction gearing is interposed between the motor C' and the drive shaft 81, as best illustrated in Figure 7, where the shaft of the motor is indicated at 85 which carries a worm 86 cooperating with a worm gear 87. The vertical shaft of the latter carries a second worm 88 cooperating with a worm gear 89 on a horizontal shaft 90. The outer end of the shaft 90 is provided with a pinion 91 meshing with a larger pinion 92 which in turn meshes with a still larger pinion 93 secured to the drive shaft 81.

As in the first described form, the supporting plate A' is provided with an opening 122 in front of the cell F' to admit the light rays to the latter and a similar guide 168 is provided for reception of a sensitized section of film 167.

The construction illustrated in Figures 5, 6 and 7 is electrically connected up with the motor and arc lamp in the same manner as described in connection with the first form and description of the operation need not be repeated.

Referring now to the arrangement shown in Figures 8 and 9, the exposure controller proper is indicated more or less diagrammatically at H and may be similar in detail construction to either of the forms already described. The controller H is preferably located adjacent the copy board 95 of a camera near one edge thereof and in such position that the photo-electric cell thereof is in line with some of the rays from the lighting sources indicated conventionally at 96—96. The camera lens is indicated conventionally at 97.

In utilizing the exposure controller with a camera, a shutter attachment for the camera lens may be employed, one form of which is indicated in Figure 9, it being understood that the same is adapted to be positioned over the lens housing. Said shutter arrangement, as shown, comprises a supporting shell 98 within which are located solenoids 99 and 100 the plungers 101 and 102 of which are normally urged downwardly and upwardly, respectively, by suitable coil springs 103 and 104, respectively.

Pivotally mounted on the supporting member 98 as indicated at 105—105, at opposite sides of the lens opening, are two shutter elements 106—106. The latter have extended arms pivotally connected to the plungers 101 and 102, respectively, as indicated at 107—107.

With the construction shown, it is evident that the shutter elements 106 are normally held in closed position, that is to shut off admission of light through the lens so long as the solenoids 99 and 100 are not energized. Said solenoids are suitably electrically connected into the electric system of the motor and arc lamp, and preferably in the line corresponding to the wire 64 of the diagram shown in Figure 10. With this arrangement, as will be apparent, upon operating the controller proper H, in the manner hereinbefore described, as soon as the motor and light circuits have been closed, the solenoids 99 and 100 will be energized, thus opening the shutters to the dotted line position shown in Figure 9 and permitting exposure through the lens. As soon as the controller H has completed its predetermined amount of travel, the light to the photo-cell thereof will be shut off, thus opening the circuits to the motor, arc lamps and shutter device shown in Figure 9 and allowing the shutters 106 to close under the influence of the springs 103 and 104.

Although there has herein been shown and described what is now considered the preferred manner of carrying out the invention, the same is merely by way of illustration and not by way of limitation, since it will be apparent to those skilled in the art that various changes and modifications may be made in details of construction and also in the application of the exposure controller proper to other photographic apparatus than those specifically referred to. All changes and modifications are contemplated that come within the scope of the claims appended hereto.

What is claimed is:

1. In a repeating photographic exposure controller, the combination with electric circuits having included therein a light source and an electric motor; of light-sensitive means also included in said circuits and which light sensitive means govern the stopping of said motor and shutting off of said light source, said light-sensitive means being so located as to be actuable by light emanating from said light source; movable shutter means including light-intercepting elements the light intercepting elements of said means being movable in a path located between said light source and said light-sensitive means and into and out of position to intercept light to said light sensitive means; and means operatively interposed between said motor and movable shutter means for actuating the latter from the motor, whereby when said shutter means has been actuated by the motor to a position to intercept the light to said light sensitive means, the latter then is so actuated as to cause the motor to stop and the light source to be shut off.

2. An exposure controller in accordance with claim 1, wherein said light-intercepting elements of the shutter means are relatively adjustable to vary the spacing therebetween and thereby the time interval between interceptions of the light to said light sensitive means.

3. In a repeating exposure controller of the character described, the combination with electric circuits having included therein a reversible electric motor, reversing and starting switches, and a light source; of light-sensitive means actuable by light emanating from said source, said means being included in said circuits and arranged to control the opening of the motor circuit and shutting off of the light source; and reversibly operable light-intercepting means driven by said motor, said means being movable to and from position to intercept light from said light source to said light-sensitive means whereby, when said light intercepting means are operated by the motor in either direction to a position to intercept light to the light sensitive means, the latter is then so actuated as to cause the motor to stop and the light source to be shut off.

4. In an exposure controller of the character described, the combination with an electric circuit having included therein an electric motor and automatically operable means for opening the motor circuit, said means including a light-sensitive element; of a light source; light-intercepting means actuated by said motor and movable into and out of position to intercept light from said source to said light-sensitive means, said light sensitive means, when the light from the light source is intercepted by said light intercepting means, being then normally automatically actuated to effect opening of the motor circuit and thus stop said light intercepting means; and supplemental means mechanically operable by said intercepting means for opening the motor circuit in the event of failure of the light sensitive means to open the motor circuit.

5. In an exposure controller of the character described, the combination with electric circuits having an electric motor and a light source included therein, said circuits having also included therein automatically operable means for opening the circuits to both said motor and light source, said means including a photo-electric cell; of a light shutter movable to and from a position to intercept light rays from said light source to said photo-electric cell; means interposed between the motor and said shutter for actuating the latter from the motor said photo-electric cell, when the light from the light source thereto is intercepted, being then normally automatically operable to open said motor and light source circuits and stop the motor and movement of the light shutter; and supplemental means mechanically operable by said shutter for opening the motor and light source circuits in event of failure of the photo-electric cell to automatically open said circuits.

6. In an exposure controller of the character described, the combination with a support; of a member reciprocatingly mounted thereon; shutters carried by said member and adjustable thereon to vary the spacing between the shutters; an electric motor; mechanism between said motor and member for reciprocating the latter; a light source; and electric circuits in which said motor and light source are included, said circuits having also included therein a photo-electric cell which governs the stopping of the motor and the light source circuit, the cell being so positioned with respect to the light source and said shutters that the latter are movable into and out of position to intercept light rays from the light source to the cell and, upon interception of such light rays, said cell being thereupon actuated to stop the motor and said shutters.

7. In an exposure controller of the character described, the combination with electric circuits having included therein a series wound motor, a manual starting switch, a motor reversing switch, automatic circuit breaking switch and a photo-electric cell; of a light source so located that light rays therefrom may normally impinge upon said photo-electric cell; a support; a member reciprocatingly mounted on said support, said member being provided with a pair of shutters adjustable thereon to vary the spacing therebetween, said member and shutters being located such that the shutters are alternately movable into and out of position to intercept light from said light source to said cell, said cell, when light from said source is intercepted by either of said shutters, being thereupon automatically actuated to effect opening of the motor and light source circuits; and driving means interposed between the motor and said member for reciprocating the latter.

8. An exposure controller in accordance with claim 7, wherein said electric circuits have also included therein a mechanically operable circuit breaking switch, said reiprocating member being provided with means for opening said circuit breaker switch in event of failure of the automatic circuit breaker switch.

9. In an exposure controller of the character described, the combination with a support; of a member reciprocatingly mounted thereon, said member being provided with shutters adjustable thereon to vary the spacing between the shutters; an electric motor; driving means interposed between said motor and member for reciprocating the latter; a light source and a photo-electric cell disposed on opposite sides of the plane in which said shutters reciprocate, said shutters being movable to and from a position to intercept light from said source to said cell; electric circuits in which are included said motor, said cell and an automatically operable circuit breaking switch governed by said cell, said cell, when a shutter is in position to intercept light thereto, being then automatically actuated to effect opening of said auomatic circuit breaking switch and thereby stop the motor and said reciprocating member; and means for temporarily supporting a transparent element having a sensitive coating thereon, in position for the transmission of light from said source therethrough to said cell and by means of which the correct spacing of said shutters and thereby the exposure time for a light sensitive coating, may be ascertained.

10. In a repeating photographic exposure controller, the combination with electric circuits having included therein a light source and an electric motor; of light sensitive means also included in said circuits and which said means govern the stopping of said motor and shutting off of said light source, said light sensitive means being so located as to be actuable by light emanating from said light source; light intercepting means movable in a path located between said light source and said light sensitive means and into and out of position to intercept light to said light sensitive means; means operatively interposed between said motor and light intercepting means for actuating the latter from the motor; and means for temporarily supporting a calibrating element having a light sensitive coating thereon, said supporting means being so located that when such a coated element is supported thereon, the latter will lie in the path of light rays from the light source to said light sensitive means.

11. An exposure controller in accordance with claim 1, wherein said movable shutter means are rotatable and the light intercepting elements thereof are relatively angularly adjustable.

WILLIAM C. HUEBNER.